United States Patent
Niebylski

[11] B 3,996,740
[45] Dec. 14, 1976

[54] EXHAUST SYSTEMS

[75] Inventor: Leonard M. Niebylski, Birmingham, Mich.

[73] Assignee: Ethyl Corporation, Richmond, Va.

[22] Filed: Feb. 19, 1975

[21] Appl. No.: 551,133

[44] Published under the second Trial Voluntary Protest Program on March 2, 1976 as document No. B 551,133.

Related U.S. Application Data

[63] Continuation-in-part of Ser. No. 368,741, June 11, 1973, which is a continuation-in-part of Ser. No. 343,105, March 20, 1973, abandoned.

[52] U.S. Cl. .............................. 60/299; 23/288 F; 138/37
[51] Int. Cl.² ........................................ F01N 3/14
[58] Field of Search ........... 60/275, 297, 299, 301, 60/302, 311, 282, 324; 181/46, 56; 138/37, 38; 23/288 FR, 288 FB, 288 FC; 55/418

[56] References Cited

UNITED STATES PATENTS

| 1,893,372 | 1/1933 | Kryzanowski | 60/299 |
| 3,109,715 | 11/1963 | Johnson | 60/299 |
| 3,185,181 | 5/1965 | Demyan | 138/37 |
| 3,597,166 | 8/1971 | Hochman | 23/288 F |

FOREIGN PATENTS OR APPLICATIONS 910,057   11/1962   United Kingdom .......... 23/288 FR Primary Examiner—Douglas Hart
Attorney, Agent, or Firm—Donald L. Johnson; Robert A. Linn; Joseph D. Odenweller

[57] ABSTRACT

The useful life of a catalyst being used in an engine exhaust system to lower the undesirable constituents in the exhaust gas of an engine being operated on gasoline containing a cyclopentadienyl manganese antiknock is greatly prolonged by providing an exhaust system having a plurality of substantially parallel proximately spaced vanes in the exhaust flow path upstream from the catalyst. The vanes have elongated recesses in their surface.

9 Claims, 4 Drawing Figures

EXHAUST SYSTEMS

This application is a continuation-in-part of application Ser. No. 368,741, filed June 11, 1973, which in turn is a continuation-in-part of application Ser. No. 343,105, filed Mar. 20, 1973, now abandoned.

BACKGROUND

Cyclopentadienyl manganese compounds are excellent antiknocks in gasoline used to operate spark ignited internal combustion engines. Use of such compounds as antiknocks is described in U.S. Pat. Nos. 2,818,417; 2,839,552 and 3,127,351, incorporated herein by reference. Not only are these compounds effective antiknock agents, but it has also been found that they do not adversely affect the activity of catalysts used to decrease the amount of undesirable constituents in engine exhaust gas. Under some operating conditions it has been found that, although the manganese antiknocks do not lessen the activity of the exhaust gas catalyst, they can interact in some manner at the surface of the catalyst bed leading to a reduction in the size of the openings into the bed thereby causing an increase in exhaust back pressure. The present invention provides a simple effective means of alleviating this problem.

SUMMARY

According to the present invention, the useful life of an exhaust gas catalyst being used in an exhaust system of an engine operating on gasoline containing a cyclopentadienyl manganese antiknock is greatly increased by providing a plurality of substantially parallel proximately spaced vanes in the exhaust flow path upstream from the catalyst arranged such that their surface is substantially parallel to the flow path of exhaust gas in the exhaust system. The vanes have elongated recesses or grooves in their surface to improve effectiveness.

DESCRIPTION OF THE PREFERRED EMBODIMENTS

A preferred embodiment of the invention is an exhaust system for a spark ignited internal combustion engine, said system comprising a catalytic reactor containing a catalyst bed, said catalytic reactor being operatively connected to receive the exhaust gas from the exhaust outlet of said engine, and a plurality of substantially parallel proximately spaced vanes located in the exhaust flow path upstream from said catalyst bed, the surface of said vanes being substantially aligned with said exhaust flow path. The surface of the vanes have recesses or grooves to improve the effectiveness of the system. The recesses can be transverse to or aligned with the direction of exhaust gas flow. They can be at various angles or randomly arranged. Preferably they are aligned in the direction of exhaust gas flow. Still more preferably, the recesses or grooves are cut or indented in both surfaces of said vane.

Figure 1:
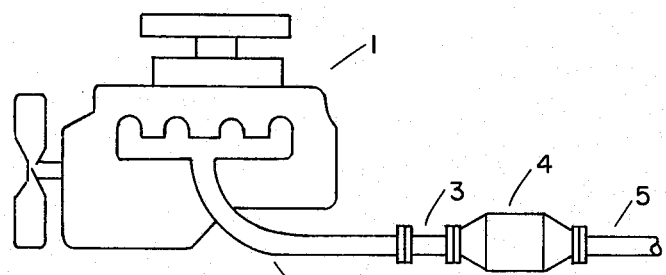
FIG. 1 is a schematic of an exhaust system for an internal combustion engine including a catalytic reactor.

Referring to FIG. 1, internal combustion engine 1 is connected by exhaust pipe 2 through vane unit 3 to catalytic converter 4 which connects to the atmosphere through tail pipe 5. In operation, the engine is started and the exhaust gas flows through pipe 2 and vane unit 3 into catalytic converter 4 wherein it contacts an exhaust gas catalyst.

In order to obtain rapid warm-up required for catalyst activation, the catalytic reactor is preferably located proximate to the engine exhaust outlet. In some embodiments catalytic reactor 4 is connected through vane unit 3 directly to the engine exhaust manifold outlet. In fact, vane unit 3 can be constructed as part of the internal structure of the exhaust manifold thereby permitting direct connection of catalytic reactor 4 to the manifold outlet.

As mentioned above, the catalytic reactor is preferably, but not necessarily, proximate to the engine. By "proximate" is meant that it is close enough such that the catalyst bed is rapidly heated to "light-off" or activation temperature. The exhaust gas temperature required to accomplish this is dependent upon the nature of the catalyst. Noble metal catalysts containing at least some noble metal such as platinum, palladium, or mixtures thereof, light-off at much lower exhaust temperatures, e.g., 350°–500°F. However, in order to insure early light-off, the catalytic reactor is preferably located such that the inlet exhaust temperature is above about 1000°F during normal engine cruise conditions. It is under these high temperature conditions (i.e., above about 1450°F) that the cyclopentadienyl manganese antiknocks are most likely to plug the catalyst and, hence, it is under these preferred conditions that the present invention is most useful.

The exhaust system of this invention is useful in both chemical oxidation and reduction applications of catalytic exhaust reactors. When reduction of nitrogen oxides is desired the engine is operated slightly rich (e.g., below 14/1 air/fuel ratio) without employing air injection. When oxidation of hydrocarbons and carbon monoxide is desired the oxygen content of the exhaust gas is increased by either operating lean (e.g., above 15/1 air/fuel ratio) or by injecting air into the exhaust gas, or both. The present invention is most useful when used in exhaust gas oxidation applications, although it is by no means limited to this.

As stated above, the embodiment being discussed uses a honeycomb monolithic ceramic supported platinum catalyst as described in U.S. Pat. Nos. 3,441,381; 3,817,714 or 3,841,839. Such "honeycomb" catalyst units are constructed such that the face of the catalyst unit consists of a plurality of small openings which are contiguous with each other and of various shapes, e.g., triangular, square, etc. These openings on the face of the catalyst extend through the catalyst unit forming a large number of small passages. The exhaust gas contacts the catalyst material in passing through these small passages.

Such catalyst units can be made by coating a corrugated ceramic structure such as described in U.S. Pat. No. 3,444,925 (incorporated herein by reference) with an activated alumina (e.g., gamma-alumina) and a platinum compound. The preferred ceramics are made according to U.S. Pat. No. 3,444,925 using alumina-silica (e.g., mullite, $3Al_2O_3 \cdot 2SiO_2$), magnesia-aluminasilica (e.g., cordierite, 2 MgO.2Al$_2$O$_3$.5SiO$_2$), or mixtures thereof. Palladium can be used in place of platinum, and since these elements generally occur in nature together, it is sometimes preferred to use mixtures of platinum and palladium.

The invention is not limited to honeycomb monolithic ceramic supported platinum or palladium catalysts. Examples of other catalytic metals include V, Cr, Mn, Fe, Co, Ni, Cu, Zn, Zr, Nb, Mo, Ru, Rh, Ag, W, Re, Os, Ir, Pb, Ba, and the like. These are generally used in an oxide form. They may be used individually or in various combinations such as Cu-Cr, Cu—Cr—V, Cu—Pd, Mn—Pd, Ni—Cr, and the like. They may be supported on the above monolithic ceramic support or on any other of numerous well-known catalyst supports such as granular, pelletized or extruded alumina, silica, silica-alumina, zirconia, magnesia, alumina-magnesia, and the like. Such catalysts are disclosed in U.S. Pat. Nos. 3,540,838; 3,524,721; 3,447,893; 3,433,581; 3,428,573; 3,425,792; 3,374,183; 3,271,324; 3,224,981; 3,224,831 and 3,207,704.

Figure 2:
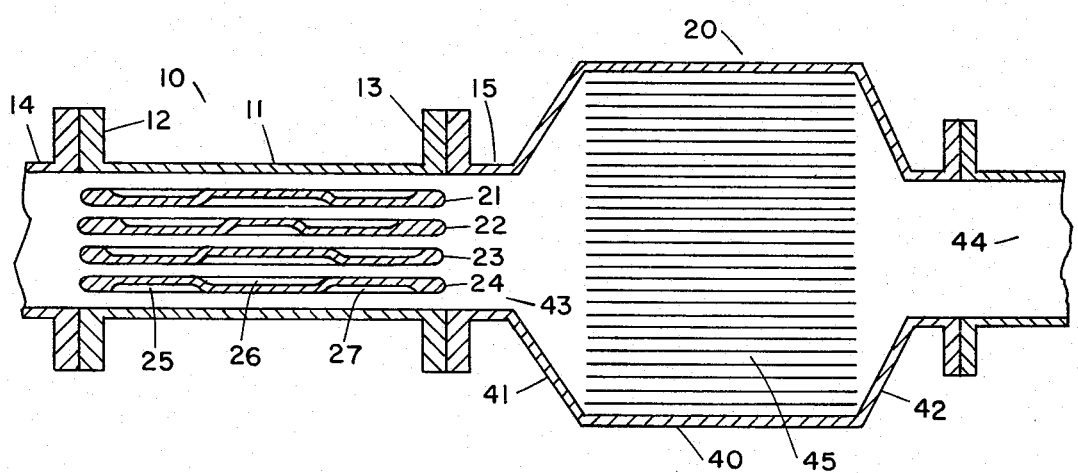
FIG. 2 is a cross-section of a parallel vane unit connected to a honeycomb monolithic ceramic catalytic converter.

FIG. 2 shows a vane unit coupled to a catalytic converter. Vane unit 10 is constructed of conduit member 11, which in this case is tubular and has flanges 12 and 13 at each end. Flange 12 is adapted to connect through pipe 14 to the outlet of the engine exhaust manifold. Flange 13 is adapted to connect to inlet portion 15 of catalytic converter 20. Located within member 11 are parallel vanes 21, 22, 23 and 24. These vanes are substantially parallel, one to another, and are aligned with the longitudinal axis of member 11. Elongated recesses 25, 26 and 27 are milled in both surfaces of each vane. In this preferred embodiment these elongated recesses are aligned with the longitudinal axis of member 11.

Figure 3:
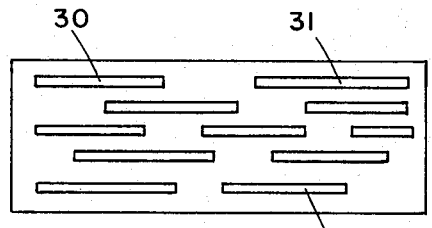
FIG. 3 is a plan view of one of the parallel vanes showing elongated recesses in its surface.

FIG. 3 shows a plan view of one of vanes 21–24. A plurality of elongated recesses 30, 31 and 32 are milled in the surface of the vane. A like number of elongated recesses are milled in the under-surface of the vane. These elongated recesses are of various lengths and are randomly distributed. Good results can be achieved using recesses about 1–5 mm wide, 1–5 mm deep and 5–30 mm long. Spacing between recesses does not appear to be critical. For example, they can be spaced about 3–10 mm apart with good results. If the recesses are to be milled into the vanes it is preferred that the vane have a substantial thickness of, for example, 3 mm. In that case, the elongated recesses can be milled about 2 mm deep in each surface without cutting through the other surface as long as two opposing recesses are not placed one over the other.

Figure 4:
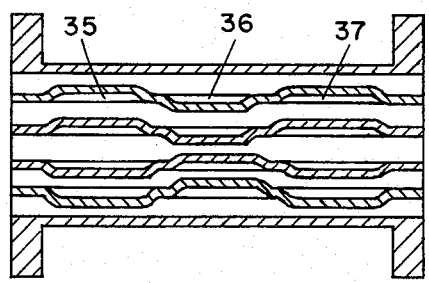
FIG. 4 is a cross-section of another version of the parallel vane unit.

FIG. 4 shows a similar embodiment in which the vanes are stamped from sheet metal. In this case, the elongated recesses 35, 36 and 37 are stamped into the surface of the metal causing a slight embossment in the opposite surface. Other than this, these vanes are substantially the same as those that are milled into the surface and produce equivalent results.

Catalytic converter 20 is constructed of cylindrical housing 40 having frustoconical end members 41 and 42 forming inlet 43 and outlet 44. Located within cylindrical housing 40 is honeycomb monolithic ceramic catalyst unit 45.

In operation, hot exhaust gas from the engine is conducted by exhaust pipe 14 into conduit member 11. It passes through the space between vanes 21, 22, 23 and 24 and thence into converter 20. It passes through catalyst bed 45, which in this instance is a honeycomb monolithic ceramic supported platinum catalyst. The treated exhaust exits at outlet 44 and after passing through a conventional muffler (not shown) is exhausted to the atmosphere.

It is not clear exactly how the invention functions to reduce catalyst plugging by cyclopentadienyl manganese antiknocks, but tests have been conducted which show that it is highly effective in accomplishing this objective. These tests were made using a single cylinder 36 CID engine operating on gasoline containing one gram of manganese per gallon as methylcyclopentadienyl manganese tricarbonyl. Air/fuel ratio was adjusted to approximately 16/1 to obtain 1.8 per cent oxygen in the exhaust. The engine was continuously operated at either 1200 r.p.m. (normal) or 1800 r.p.m. (severe) and the exhaust gas conducted to a catalytic reactor of the type shown in FIG. 2 containing a honeycomb monolithic ceramic supported platinum catalyst (Engelhard Industries, Inc., PTX-313). The exhaust temperature at the catalyst inlet was about 1500°–1525°F in some tests and 1650°–1750°F in more severe tests. Exhaust back pressure was measured to determine degree of catalyst plugging. Initial back pressure was about 0.3 psig. An increase to 2 psig was considered a plugged catalyst bed. Results obtained compared to a no plate control and the vanes without the elongated recesses are shown in the following table.

|  | Hours to Plugging | |
|---|---|---|
|  | 1500–1525°F | 1650–1750°F |
| Control | 45–62 | <38 |
| Device of FIG. 2 | — | 253[1],280[1] |
| Device of FIG. 2 without recesses | 386 | 135 |

[1]Duplicate tests — neither test reached 2 psig.

As these results show, the device without the recess is very effective at 1500°–1525°F. It remains effective under the more severe test conditions of 1650°–1750°F. However, its effectiveness is sharply improved by including the elongated recesses in the vanes as provided by this invention.

I claim:

1. In an exhaust system for an internal combustion engine, said system comprising a catalytic reactor containing a catalyst bed, said catalytic reactor being operatively connected by exhaust conduit means to receive the exhaust gas from said internal combustion engine, the improvement which comprises a plurality of substantially parallel proximately spaced vanes located in the exhaust flow path between said engine and said catalyst bed, the surface of said vanes being substantially aligned with said exhaust flow path, said vanes having elongated recesses in their surface.

2. An improved exhaust system of claim 1 wherein said catalyst bed is a monolithic honeycomb ceramic supported catalyst.

3. An improved exhaust system of claim 2 wherein said recesses are aligned in the direction of exhaust flow.

4. An improved exhaust system of claim 3 wherein said recesses are on both surfaces of said vanes.

5. An article of manufacture especially adapted for installation in an exhaust system of an internal combustion engine between said engine and a catalytic reactor and which inhibits plugging of said catalytic reactor when said engine is operated on gasoline containing a cyclopentadienyl manganese antiknock, said article comprising a conduit member having connection means at both ends, one of said connection means being adapted to connect with the exhaust pipe from said engine and receive engine exhaust gas, the other of said connection means being adapted to connect to conduit means leading to the entry port of said catalytic reactor, a plurality of substantially parallel proximately spaced vanes located in said conduit member, the surface of said vanes being substantially aligned with the longitudinal axis of said conduit member, said vanes having elongated recesses in their surface.

6. An article of claim 5 wherein said recesses are aligned with the longitudinal axis of said conduit member.

7. An article of claim 6 wherein said vanes are spaced about 2-7 mm apart.

8. An article of claim 6 wherein said vanes have elongated recesses in both surfaces.

9. An article of claim 8 wherein said vanes are spaced about 2-7 mm apart.

* * * * *